US011242800B2

(12) United States Patent
Jain et al.

(10) Patent No.: US 11,242,800 B2
(45) Date of Patent: Feb. 8, 2022

(54) SYSTEMS AND METHODS FOR REDUCING COKE FORMATION OF FUEL SUPPLY SYSTEMS

(71) Applicant: General Electric Company, Schenectady, NY (US)

(72) Inventors: Rajkumar Jain, Bangalore (IN); Sudhir Ramesh Chaudhari, Bangalore (IN); James Frederik den Outer, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 15/805,765

(22) Filed: Nov. 7, 2017

(65) Prior Publication Data
US 2019/0137104 A1    May 9, 2019

(51) Int. Cl.
*F02C 7/22*    (2006.01)
*F23R 3/28*    (2006.01)

(52) U.S. Cl.
CPC .............. *F02C 7/222* (2013.01); *F23R 3/286* (2013.01)

(58) Field of Classification Search
CPC .. F02C 7/22; F02C 7/222; F02C 7/232; F02C 7/236; F23R 3/286; F23R 2900/00004; F23R 2900/00018; F05D 2230/90; F05D 2300/611
See application file for complete search history.

(56) References Cited

U.S. PATENT DOCUMENTS

| | | | | |
|---|---|---|---|---|
| 3,331,746 A | * | 7/1967 | Heinrich | G21C 3/20 376/376 |
| 5,315,822 A | | 5/1994 | Edwards, III | |
| 5,336,560 A | * | 8/1994 | Spence | C23C 18/1208 428/336 |
| 5,558,783 A | * | 9/1996 | McGuinness | B01J 3/008 210/180 |
| 5,897,921 A | * | 4/1999 | Borom | C23C 4/02 427/454 |

(Continued)

FOREIGN PATENT DOCUMENTS

| | | | |
|---|---|---|---|
| EP | 2453039 | * | 5/2012 |
| WO | 2016032436 | | 3/2016 |

OTHER PUBLICATIONS

Internet Article "RLHY-12 High Temperature resistant thermal insulation coating (year 2014)"; 3 pages (Year: 2014).*

*Primary Examiner* — William H Rodriguez
(74) *Attorney, Agent, or Firm* — Fletcher Yoder, P.C.

(57) ABSTRACT

A fuel supply system includes a first component configured to direct a fuel flow to a combustor of an engine system. The first component includes a first inner surface and a first outer surface. The fuel supply system also includes an outer coating disposed on the first outer surface of the first component. The outer coating is configured to thermally insulate a first interior of the first component to reduce non-catalytic coke formation in the first interior. Additionally, the fuel supply system includes an inner coating disposed on the first inner surface of the first component. The inner coating is configured to reduce the fuel flow from contacting a base material of the first inner surface of the first component to reduce catalytic coke formation in the first interior.

20 Claims, 6 Drawing Sheets

(56) References Cited

U.S. PATENT DOCUMENTS

| | | | |
|---|---|---|---|
| 6,190,780 B1* | 2/2001 | Shoji | C09D 5/084 |
| | | | 106/14.12 |
| 6,630,244 B1* | 10/2003 | Mao | C07C 43/17 |
| | | | 428/447 |
| 6,755,024 B1* | 6/2004 | Mao | F23D 11/107 |
| | | | 239/416 |
| 7,296,142 B2 | 11/2007 | Lim et al. | |
| 8,097,316 B2* | 1/2012 | Sato | F16L 11/045 |
| | | | 428/35.7 |
| 8,413,444 B2 | 4/2013 | Ryan | |
| 10,639,872 B2* | 5/2020 | Sato | B32B 27/34 |
| 10,807,342 B2* | 10/2020 | Proof | F16L 11/127 |
| 2003/0143440 A1* | 7/2003 | Tao | H01M 8/04447 |
| | | | 429/444 |
| 2003/0228441 A1* | 12/2003 | Subramanian | C23C 4/18 |
| | | | 428/120 |
| 2004/0126523 A1* | 7/2004 | Masuda | B32B 27/34 |
| | | | 428/35.7 |
| 2004/0219079 A1* | 11/2004 | Hagen | F23R 3/28 |
| | | | 422/607 |
| 2005/0081525 A1* | 4/2005 | Kaplan | F02C 7/14 |
| | | | 60/734 |
| 2005/0166598 A1* | 8/2005 | Spadaccini | B01D 19/0031 |
| | | | 60/782 |
| 2006/0150631 A1 | 7/2006 | Smith et al. | |
| 2007/0095952 A1* | 5/2007 | Heinstein | F02M 61/168 |
| | | | 239/585.1 |
| 2007/0104907 A1* | 5/2007 | Nishioka | B32B 27/08 |
| | | | 428/36.9 |
| 2010/0269504 A1* | 10/2010 | Gage | F16L 58/1009 |
| | | | 60/734 |
| 2011/0100015 A1 | 5/2011 | Alagappan et al. | |
| 2011/0162751 A1* | 7/2011 | Fitzgerald | C23C 30/00 |
| | | | 138/145 |
| 2012/0024403 A1* | 2/2012 | Gage | F02C 7/222 |
| | | | 137/561 R |
| 2013/0086909 A1* | 4/2013 | Wang | F02C 7/14 |
| | | | 60/730 |
| 2013/0186100 A1* | 7/2013 | Rhoden | B64D 13/006 |
| | | | 60/782 |
| 2014/0097275 A1* | 4/2014 | Wang | F02M 61/1806 |
| | | | 239/584 |
| 2015/0060403 A1* | 3/2015 | Carter | B22F 3/22 |
| | | | 216/53 |
| 2016/0230274 A1* | 8/2016 | Flannery | C23C 28/343 |
| 2017/0051675 A1* | 2/2017 | McMasters | B22F 3/1055 |
| 2017/0210222 A1* | 7/2017 | Covert | B60K 15/0403 |
| 2017/0259665 A1* | 9/2017 | Zhangsheng | B23K 31/02 |
| 2018/0030309 A1* | 2/2018 | Caillouette | C08G 18/48 |
| 2019/0256345 A1* | 8/2019 | Wetzel | B67D 7/421 |
| 2019/0351759 A1* | 11/2019 | Willis | B60K 15/04 |
| 2020/0232094 A1* | 7/2020 | Schuster | C23C 16/30 |

* cited by examiner

SYSTEMS AND METHODS FOR REDUCING COKE FORMATION OF FUEL SUPPLY SYSTEMS

BACKGROUND

The subject matter disclosed herein relates to a fuel supply system of a gas turbine system and, more particularly, to systems and methods for reducing coke formation of the fuel supply system.

Gas turbine systems generally include a compressor, a combustor, and a turbine. The compressor receives air from an air intake, compresses the air, and subsequently directs the compressed air to the combustor. The combustor combusts a mixture of the compressed air and a fuel provided via a fuel supply system to produce hot combustion gases. The combustion gases are directed to the turbine to produce work, such as to drive an electrical generator or other load. In some conditions, the fuel within the fuel supply system may be heated to a temperature above a thermal degradation temperature at which the fuel degrades. Thermal degradation of the fuel may cause non-catalytic coke formation on surfaces of the fuel supply system. Additionally, catalytic reactions of the fuel with base material within the fuel supply system may result in catalytic coke formation on the surfaces of the fuel supply system. The coke formation may cause the components of the fuel supply system to become sticky or lose sealing effectiveness. Circulation or purge systems to reduce coke formation may increase system complexity or cost. Additionally, circulation or purge systems may use a high amount of power, thus negatively affecting the performance of the gas turbine system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a fuel supply system includes a first component configured to direct a fuel flow to a combustor of an engine system. The first component includes a first inner surface and a first outer surface. The fuel supply system also includes an outer coating disposed on the first outer surface of the first component. The outer coating is configured to thermally insulate a first interior of the first component to reduce non-catalytic coke formation in the first interior. Additionally, the fuel supply system includes an inner coating disposed on the first inner surface of the first component. The inner coating is configured to reduce the fuel flow from contacting a base material of the first inner surface of the first component to reduce catalytic coke formation in the first interior.

In a second embodiment, a fuel supply system includes a plurality of components configured to direct a fuel flow to a combustor of a gas turbine system. Each component of the plurality of components includes a respective inner surface, a respective outer surface, and a respective interior. The fuel supply system also includes a plurality of outer coatings disposed on the respective outer surface of each component of the plurality of components. Each respective outer coating is configured to thermally insulate the respective interior of the respective component to reduce non-catalytic coke formation within respective interior. Additionally, the fuel supply system includes a plurality of inner coatings disposed on the respective inner surface of each component of the plurality of components. Each respective inner coating is configured to reduce the fuel flow from contacting a respective base material of the respective inner surface of each component of the plurality of components to reduce catalytic coke formation in the respective interior.

In a third embodiment, a method includes applying an inner coating to an inner surface of a component configured to transport fuel to a combustor of a gas turbine engine. The inner coating is configured to reduce catalytic coke formation in an interior of the component. Additionally, the method includes applying an outer coating to an outer surface of the component to thermally insulate the interior of the component from an exterior environment to reduce non-catalytic coke formation in the interior.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
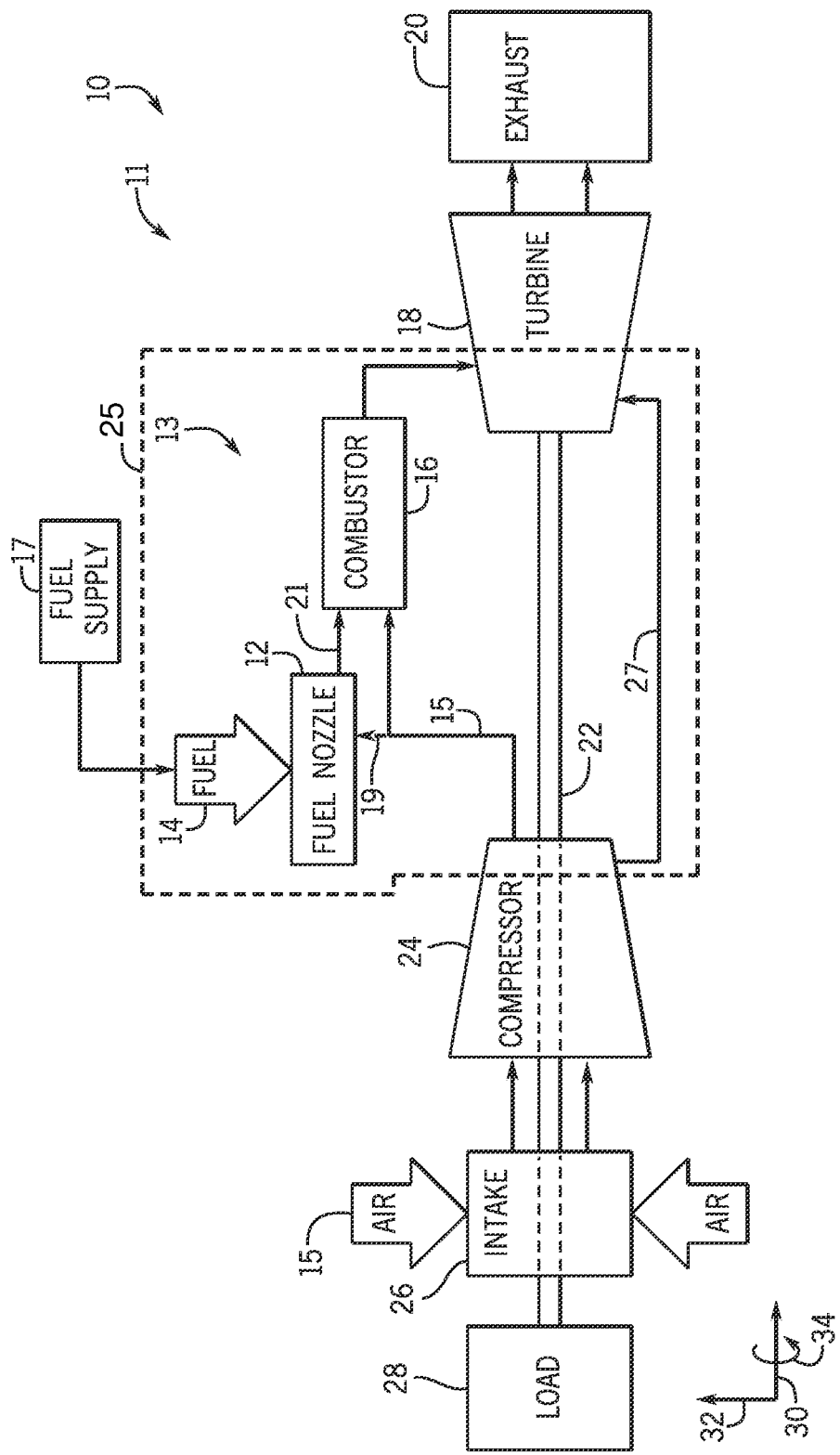
FIG. 1 is a block diagram of an embodiment of a gas turbine system.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Present embodiments are directed to systems and methods for reducing or eliminating coke formation for a fuel supply system of a gas turbine system. The fuel supply system directs fuel from a fuel supply to a combustor of the gas turbine engine. The gas turbine engine which transforms chemical energy within the fuel to mechanical energy used to drive a load connected to the combustor. The fuel supplied to the gas turbine system may generally contains a mixture of hydrocarbons, and may contain air, water, additives, contaminants, other components, or any combination thereof. In certain conditions, the fuel may degrade to form coke, or carbon deposits, within the fuel supply system. For example, coke formation may generally proceed via two different routes: non-catalytic thermal degradation of the fuel (e.g., non-catalytic coke formation) and catalytic carbon deposition of the fuel on base material within the fuel supply system (e.g., catalytic coke formation). As an example of non-catalytic coke formation, components of the fuel supply system may be located in an environment having a temperature that is higher than a thermal degradation temperature of the fuel. If exposed to the temperature higher than the thermal degradation temperature, molecular bonds of the fuel may break, thus causing carbon and other elements or molecules within the fuel to stick and deposit within the fuel supply system. Additionally, the catalytic coke formation may proceed when the base material within the fuel supply system is exposed to the fuel (e.g., in the presence of oxygen), thus acting as a catalyst to increase a rate at which the fuel forms coke or carbon deposits on the surface of the fuel supply system. The coke formed on the inner surfaces of the fuel supply system may negatively affect an efficiency of the fuel supply system by reducing sealing effectiveness of valves, causing components to stick, decreasing component reliability, and increasing maintenance costs.

Thus, to simultaneously reduce, prevent, or eliminate both non-catalytic coke formation and catalytic coke formation within the fuel supply system, a coating (e.g., a thermal barrier coating) may be applied to both an inner surface and an outer surface of a component of the fuel supply system. Indeed, components such as conduits, valves, and nozzles within the fuel supply system may be provided with respective coatings on respective inner surfaces and outer surfaces of the components. The coating may be applied to the outer surface of the component to insulate an interior (e.g., a space within and/or surrounded by the inner surfaces) of the component from a hot environment within a compressor discharge casing. That is, the coating on the outer surface may reduce or prevent thermal energy from the compressor discharge casing from entering the components to maintain an interior temperature within the components that is less than the thermal degradation temperature of the fuel. It is desirable to keep the interior temperature less than the thermal degradation temperature of the fuel to prevent or reduce an amount of coke that may form via thermal degradation. Additionally, the thermal barrier coating may be applied to the inner surface of the component to physically separate the fuel from contacting base material within the component. Thus, the catalytic coke formation process is reduced or prevented via the thermal barrier coating on the inner surface of the component. By using a common thermal barrier coating on the outer surface and the inner surface of components of the fuel supply system, costs for applying the thermal barrier coating may be reduced and non-catalytic coke formation and catalytic coke formation may be simultaneously reduced or prevented.

Turning now to the drawings and referring first to FIG. 1, a block diagram of an embodiment of a gas turbine system 10 having a gas turbine engine 11 is illustrated. The present disclosure may relate to any turbomachine system and the gas turbine system 10 discussed herein does not limit the scope by which the present disclosure applies. Indeed, in certain embodiments, the embodiments discussed herein may also be applied to internal combustion engines, such as reciprocating engines, rotary engines, or continuous combustion engines. A turbomachine system may relate to any system that involves the transfer of energy between a rotor and a fluid, or vice versa, and the illustrated gas turbine system 10 is only meant to serve as a representation of an embodiment of a turbomachine system. To generate power the gas turbine system 10 may use liquid or gaseous fuel, such as natural gas and/or a hydrogen rich synthetic gas, to drive the gas turbine system 10. The gas turbine system 10 may include one or more fuel nozzles 12 (e.g., liquid fuel nozzles) located inside one or more combustors 16. Indeed, although shown schematically as being outside or separate from the combustor 16, the fuel nozzles 12 may be disposed inside the combustor 16. As depicted, one or more fuel nozzles 12 intake a fuel 14 from a fuel supply 17. For example, one or more fuel nozzles 12 may be used to intake liquid fuel, and one or more other fuel nozzles 12 may be used to intake gaseous fuel.

The combustor 16 may also receive an oxidant, such as compressed air 15 from the compressor 24, oxygen, oxygen-enriched air, oxygen reduced air, or any combination thereof via a compressor discharge casing 25. A fuel supply system 13 of the gas turbine system 10 may generally include all or a portion of fuel-wetted components of the gas turbine system 10, such as the fuel supply 17, the fuel nozzle 12, the combustor 16, as well as any fuel conduits and control elements extending therebetween. Additionally, the compressor discharge casing 25 may generally extend between the compressor 24 and the turbine 18, encompassing all or a portion of the fuel supply system 13 within an a common enclosure. Although the following discussion refers to the oxidant as the compressed air 15, any suitable oxidant may be used with the disclosed embodiments. In some embodiments, as shown by arrow 19, the compressed air 15 may be optionally directed to the fuel nozzles 12. The fuel nozzles 12 may distribute a fuel-air mixture 21 into the combustor 16 in a suitable ratio for desired combustion, emissions, fuel consumption, and power output. In embodiments in which the compressed air 19 is not directed through the fuel nozzles 12, the fuel 14 and the compressed air 15 may mix to form a fuel-air mixture inside the combustor 16. The fuel-air mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the gas turbine system 10.

The shaft 22 may be connected to various components of the gas turbine system 10, including the compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or the combustor 16. A portion of compressed air (e.g., discharged air) from the compressor 24 may be diverted to the turbine 18 or its components without passing through the combustor 16, as shown by arrow 27. The discharged air (e.g., cooling fluid) may be utilized to cool one or more turbine components, such as shrouds, nozzles on the stator, or buckets on the rotor. The shaft 22 may also be connected to a load 28, which may be a stationary load or a vehicle, such as an electrical generator in a power plant or a propeller on an aircraft, for example. The load 28 may include any suitable device capable of being powered by the rotational output of the gas turbine system 10. Moreover, the gas turbine system 10 may extend along an axis or axial direction 30, a radial direction 32 toward or away from the axis 30, and a circumferential direction 34 around the axis 30.

With this understanding of the gas turbine system 10, further discussion of coke formation within the fuel supply system 13 may be more readily understood. For example, the gas turbine system 10 may include high temperature environments, such as the compressor discharge casing 25 or an enclosure in which the gas turbine system 10 is disposed. Thermal energy may be transferred to the compressor discharge casing 25 from the compressor 24 (e.g., via the compressed air 15), from the combustor 16 (e.g., via high-temperature combustion reactions) or from fuel preheaters to provide the high temperature environment within the compressor discharge casing 25. As will be discussed in more detail below, fuel-wetted components of the fuel supply system 13, including those components within the compressor discharge casing 25 or other high temperature environments, may be treated with a thermal barrier coating on respective outer and inner surfaces of the components to reduce coking therein. The components of the fuel supply system 13 include the fuel supply 17, as well as the fuel nozzle 12, fuel conduits, and valves (e.g., three-way valves, check valves, mixing valves) fluidly connected between the fuel supply 17 and the combustor 16.

In certain operating conditions, the temperature within the high temperature environment proximate components of the fuel supply system 13 may reach or exceed a thermal degradation temperature of the fuel 14 (e.g., 150 degrees Fahrenheit, 200 degrees Fahrenheit, 250 degrees Fahrenheit, 300 degrees Fahrenheit, 60 degrees Celsius, 90 degrees Celsius, 120 degrees Celsius, 150 degrees Celsius, 180 degrees Celsius, or higher). The thermal degradation temperature of the fuel 14 corresponds to a temperature at which the fuel 14 has sufficient thermal energy to chemically degrade or decompose (e.g., by breaking chemical bonds within molecules of the fuel 14). The thermal degradation temperature may be based on the composition of the fuel 14. Thermal degradation of the fuel may generate carbon deposits through a process referred to herein as non-catalytic coke formation. These carbon deposits (e.g., coke) may form on surfaces within the fuel supply system 13. However, the outer surface of components within the fuel supply system 13 may be coated with the thermal barrier coating to insulate the components from thermal energy of the compressor discharge casing 25. In this manner, the thermal barrier coating may prevent or reduce non-catalytic coke formation in the fuel supply system 13 by maintaining the fuel 14 at a temperature less than the thermal degradation temperature.

Moreover, the components within the fuel supply system 13 may be fully or partially formed from a catalytic base material (e.g., base metal, iron, cobalt, nickel, copper, tin, zinc, chromium, alloys thereof) that enables catalytic coke formation. As discussed above, if exposed to the base material, the fuel 14 may undergo catalytic decomposition that causes catalytic coke formation upon the surfaces of the base material. However, components within the fuel supply system 13 include the thermal barrier coating applied on an inner surface thereof to physically separate the fuel 14 from contacting the base material and causing catalytic coke formation thereon. In this manner, the thermal barrier coating may prevent or reduce catalytic coke formation in the fuel supply system 13 by physically separating (e.g., isolating) the fuel 14 from the base material.

Figure 2:
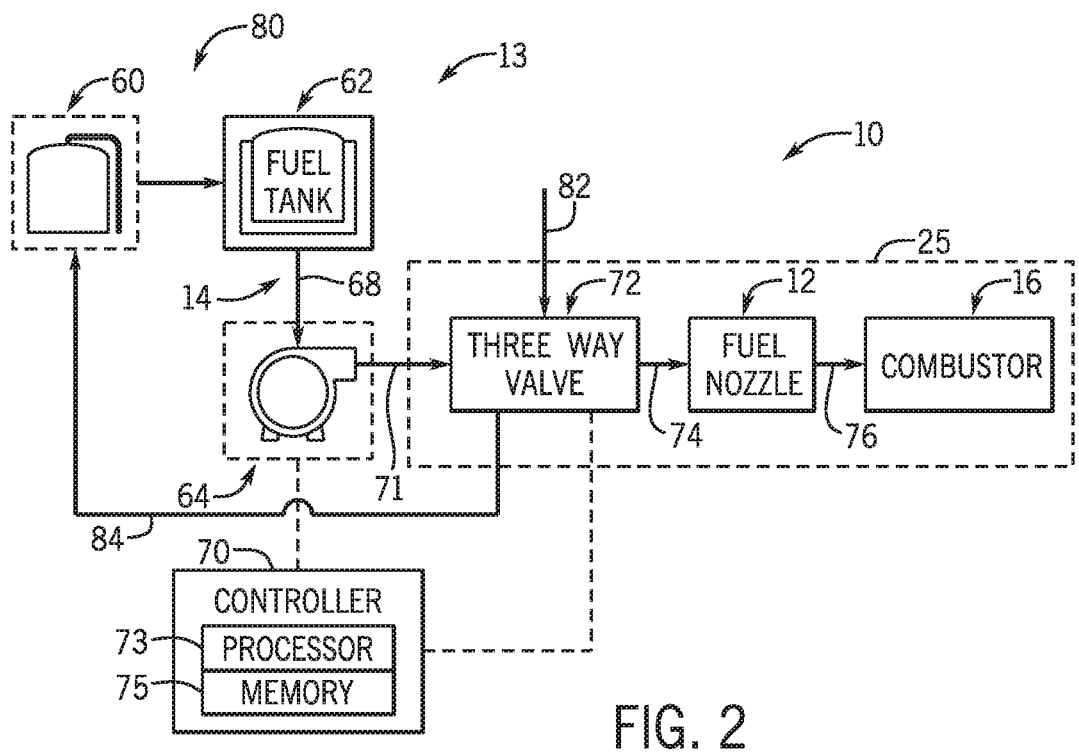
FIG. 2 is a block diagram of an embodiment of a fuel supply system of the gas turbine system of FIG. 1 having a three-way valve.

The techniques disclosed herein may be better understood with reference to a more detailed description of various embodiments of the fuel supply system 13. Turning now to FIG. 2, the fuel supply system 13 may include a recirculation and purging skid 60, a fuel tank 62, and a fuel forwarding pump 64 disposed upstream of the compressor discharge casing 25. As shown, fuel 14 flows through a conduit 68 fluidly coupled between the fuel tank 62 and the fuel forwarding pump 64, through the fuel forwarding pump 64, and through a conduit 71 fluidly coupled to the compressor discharge casing 25. The fuel 14 may continue through the conduit 71 into the compressor discharge casing 25, thus reaching a three-way valve 72. The fuel 14 may continue through the three-way valve 72, through a conduit 74 fluidly coupled between the three-way valve 72 and the fuel nozzle 12, through the fuel nozzle 12, through a conduit 76 fluidly coupled between the fuel nozzle 12 and the combustor 16, and into the combustor 16. The components of the fuel supply system 13 thus fluidly connect the fuel tank 62 to the combustor 16 to enable combustion therein. However, other suitable components may be included in the fuel supply system 13, or certain components of the fuel supply system 13 may be excluded, as described in more detail below.

To reduce or prevent coke formation, one or more of the components of the fuel supply system 13 may include outer thermal barrier coatings (e.g., outer coatings) and inner thermal barrier coatings (e.g., inner coatings). Specific applications of these coatings are discussed in more detail with reference to FIGS. 4-8 below. For example, an outer coating may be applied on fuel-wetted components within the compressor discharge casing 25 or another high temperature environment to insulate fuel flowing within the components from thermally decomposing and forming carbon deposits via non-catalytic coke formation. Additionally, an inner coating may be applied to fuel-wetted components within or outside of the compressor discharge casing 25 to physically separate fuel within the components from contacting base material and forming carbon deposits via catalytic coke formation. Thus, the outer coating and the inner coating respectively reduce or eliminate both non-catalytic coke formation and catalytic coke formation within the fuel supply system 13, a coating (e.g., a thermal barrier coating) may be applied to both an inner surface and an outer surface of a component of the fuel supply system 13.

Additionally, as shown, a recirculation and purging system 80 having the recirculation and purging skid 60 and the fuel forwarding pump 64 may be included in the fuel supply system 13. In addition to the coating discussed herein, some embodiments of the fuel supply system 13 may include the recirculation and purging system 80 to further reduce or prevent coke formation in the fuel-wetted components of the fuel supply system 13. In some embodiments, the recirculation and purging system 80 recirculates the fuel 14 during operation of the gas turbine system 10, and removes the fuel 14 from the fuel supply system 13 when the gas turbine system 10 is not operating. The recirculation and purging skid 60 may store nitrogen or another suitable fluid for purging the fuel supply system 13 of fuel. Additionally, the fuel forwarding pump 64 may be a positive displacement pump, a centrifugal pump, a screw type pump, etc. Additionally, the fuel forwarding pump 64 may include a pump assembly having more than one pump in a series arrangement or a parallel arrangement.

In some embodiments, the fuel supply system 13 may recirculate the fuel 14 to maintain the temperature of the fuel 14 less than the thermal degradation temperature, thus reducing or preventing non-catalytic coke formation in cooperation with the outer coating. For example, upon instruction by a controller 70 (e.g., an electronic or processor-based controller, including a processor 73 and a memory 75), a valve may open to enable the fuel 14 stored within the fuel tank 62 to flow to the fuel forwarding pump 64. The fuel forwarding pump 64 pressurizes the fuel 14, which proceeds to the three-way valve 72. At the three-way valve 72, a first portion of the fuel proceeds through the conduit 74 to the fuel nozzle 12 for injection into the combustor 16. Actuating air 82 may be introduced in the three-way valve 72 to selectively actuate a piston or other actuator within the three-way valve 72. In some embodiments, atomizing air may also be introduced to the three-way valve 72 to atomize and carry particles of the fuel 14 into the fuel nozzle 12. In some embodiments, the three-way valve may be a JASC® three-way purge valve, produced by JASC, Inc. of Tempe, Ariz.

Additionally, a second portion of the fuel 14 may be directed from the three-way valve 72 and back to the recirculation and purging skid 60 through a recirculation conduit 84. Once returned to the recirculation and purging skid 60, the second portion of the fuel 14 may be forwarded back to the fuel tank 62. Thus, the second portion of the fuel 14 travels in a closed recirculation loop to reduce stagnation of fuel 14. By combining the fuel recirculation with use of the thermal barrier coating on the outer and inner surfaces of components of the fuel supply system 13, the non-catalytic coke formation may be reduced or eliminated more effectively than by fuel recirculation alone.

Moreover, the recirculation and purging skid 60 may use nitrogen or another unreactive gas to purge the fuel supply system 13 of the fuel 14. By removing the fuel 14 from the fuel supply system 13, the fuel 14 may contact base material within the fuel supply system 13 for a reduced amount of time, thus reducing catalytic coke formation in cooperation with the inner coating applied on the inner surface of the fuel-wetted components of the fuel supply system 13. For example, during engine shut down, turn down, or other periods of time when the combustor 16 does not receive the fuel 14, the recirculation and purging skid 60 may release nitrogen along the conduits fluidly coupling the components of the fuel supply system 13. The fuel 14 may then be flushed out of the fuel supply system 13. By combining the nitrogen purging with use of the coating on the outer and inner surfaces of components of the fuel supply system 13 as discussed herein, the coke formation may be reduced or eliminated more effectively than by nitrogen purging alone.

Moreover, the effectiveness of the outer coating and the inner coating in reducing coking within the fuel-wetted components of the fuel supply system 13 may enable the recirculation and purging system 80 to be eliminated. In such embodiments, the fuel supply system 13 does not include the recirculation and purging system 80 having the recirculation and purging skid 60, the fuel forwarding pump 64, or both, as indicated by the dashed lines around the recirculation and purging skid 60 and the fuel forwarding pump 64. That is, in certain embodiments, the fuel supply system 13 includes the outer coating and the inner coating for fuel-wetted components, but excludes the recirculation and purging skid 60, the fuel forwarding pump 64, or both. Instead, the fuel supply system 13 may supply the fuel 14 from the fuel tank 62, and then send the fuel 14 through a first inlet of the three-way valve 72. The actuating air 82 enters a second inlet of the three-way valve 72 to actuate the fuel 14 therethrough. Then, a third inlet of the three-way valve 72 (e.g., that may be or may have been coupled to a recirculation conduit) is blocked or otherwise closed in the fuel supply system 13 in embodiments in which recirculation of the fuel 14 is not provided. By providing the fuel 14 without recirculation, operating costs for running the fuel forwarding pump 64, the recirculation and purging skid 60, or both are reduced. In some embodiments, the fuel supply system 13 may be treated with the thermal barrier coatings and the recirculation and purging system 80 may be removed retroactively (e.g., after installation and/or operation of a fuel supply system having the recirculation and purging system).

Figure 3:
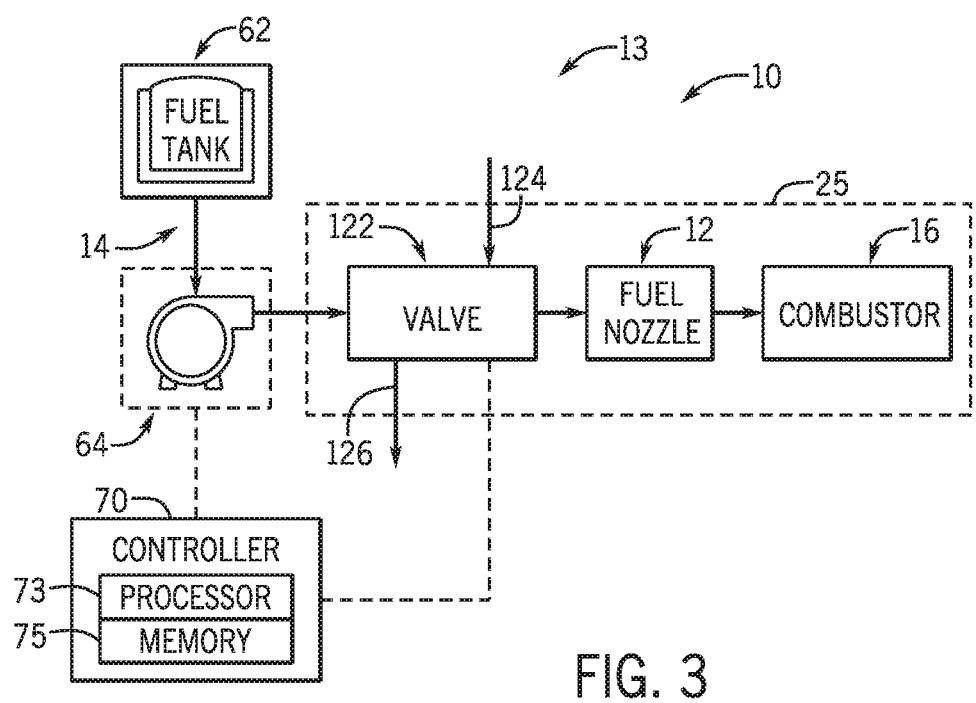
FIG. 3 is a block diagram of an embodiment of a fuel supply system of the gas turbine system of FIG. 1 having a valve.

Additionally, FIG. 3 is a block diagram of an embodiment of the fuel supply system 13 having a valve 122, such as a liquid fuel check valve or a mixing valve. The fuel forwarding pump 64 may direct the fuel 14 from the fuel tank to the valve 122, while also pressurizing the fuel 14. The valve then directs the fuel 14 into the fuel nozzle 12, which provides the fuel into the combustor 16. By providing the fuel 14 without recirculation, operating costs for operating the recirculation and purging skid may be saved.

Additionally, to reduce or prevent coking of the components of the fuel supply system 13, the components (e.g., fuel conduits, fuel nozzles, three-way valves, check valves, mixing valves, fuel forwarding pumps) include the thermal barrier coating and the inner coating, as discussed in more detail below. Indeed, the components that direct fuel to the combustor 16 may be treated with the coating on the inner surface to reduce catalytic coke formation, while the outer surface of the components may be treated with the coating to insulate the fuel 14 from high temperatures within the compressor discharge casing 25 or other high temperature environments to reduce non-catalytic coke formation.

In some embodiments, the valve 122 is a cooled check valve. That is, a working fluid 124, such as water, may be supplied to the valve 122 to cool the valve 122. The working fluid 124 thus absorbs thermal energy from the valve 122, and then leaves the valve 122 as a used working fluid 126. By cooling the valve 122, the working fluid 124 helps maintain the fuel 14 flowing within the fuel supply system 13 less than the thermal degradation temperature, thus reducing or preventing non-catalytic coke formation therein.

Additionally, in some embodiments, the valve 122 is a mixing valve. In such embodiments, the fuel forwarding pump may be omitted, as the working fluid 124 (e.g., water) provided to the mixing valve may drive the mixing valve 142 to rotate, thus emulsifying the working fluid 124 with the fuel 14. The emulsion of water and fuel 14 then proceeds through the fuel nozzle 12 and into the combustor 16. Moreover, when, the valve 122 is a mixing valve, the mixing valve may be used for water purge operations. That is, after shut down of the gas turbine system 10, the working fluid 124 may be provided to the mixing valve to remove stagnant fuel 14 from the mixing valve and fuel nozzle 12. Removing the stagnant fuel 14 reduces a duration of time that the fuel may contact base material within the fuel supply system 13, thus further reducing catalytic coke formation therein. Additionally, use of the outer coating and the inner coating may enable the flow of working fluid 124 for cooling the valve to be reduced or omitted, or enable the water purge operations to be performed less frequently or ceased.

Figure 4:
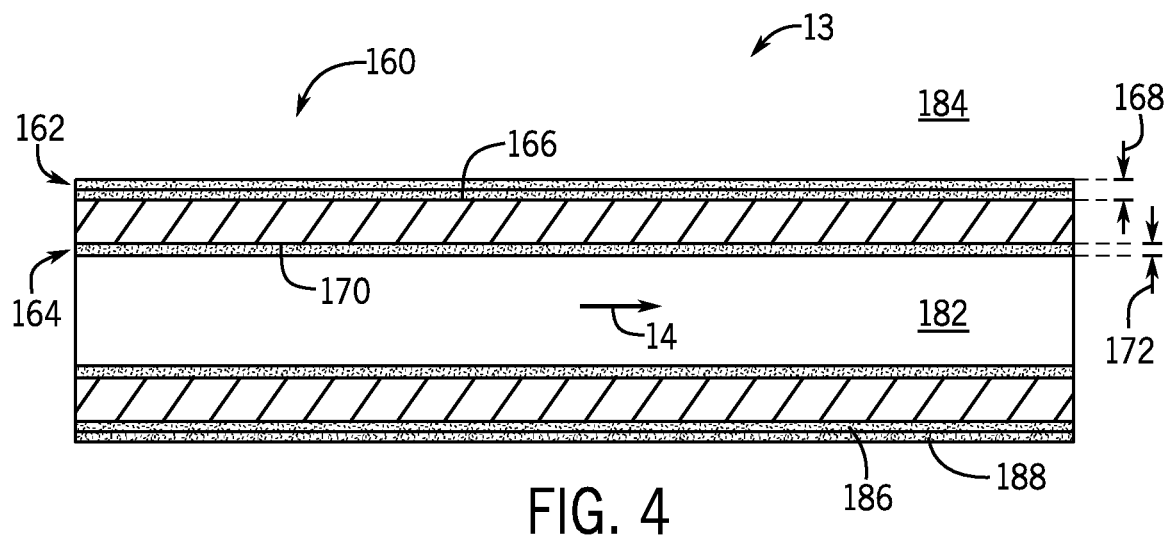
FIG. 4 is a cross-section of an embodiment of a fuel conduit having an outer coating and an inner coating.

Looking more closely at the coatings, FIG. 4 is a cross-section of an embodiment of a fuel conduit 160 having an outer coating 162 and an inner coating 164. The fuel conduit 160 may be a conduit that connects any number of fuel-wetted components of the fuel supply system 13. The fuel conduit 160 may be shaped as a straight tube or a cylinder, a bent tube or cylinder (e.g., elbow bend), a rectangular prism, a triangular prism, or any other suitable shape for transporting a fluid. As shown, the outer coating 162 is disposed on an outer surface 166 of the fuel conduit 160 and has an outer coating thickness 168. Additionally, the inner coating 164 is disposed on an inner surface 170 of the fuel conduit 160 and has an inner coating thickness 172. The outer coating 162 and the inner coating 164 may operate to simultaneously reduce or prevent fuel 14 from coking within the interior of the fuel conduit 160 via both non-catalytic coke formation and catalytic coke formation.

The fuel conduit 160 may be located within the compressor discharge casing 25 of the fuel supply system 13. As such, the fuel conduit 160 experiences temperatures that may exceed the thermal degradation temperature of the fuel 14. However, the outer coating 162 insulates an interior 182 of the fuel conduit 160 from an exterior environment 184 (e.g., environment outside the fuel conduit 160, environment having a temperature greater than the thermal degradation temperature of the fuel 14). For example, the outer coating 162 may be a thermal barrier coating that reduces thermal energy passing through the thermal barrier coating, thus thermally isolating an interior of the fuel conduit 160 from the exterior environment 184. The outer coating 162 on components of the fuel supply system 13 within the heated exterior environment 184 may reduce heat transfer to an interior of the components of the fuel supply system. As may be appreciated, thermal energy may be transferred along coupled components of the fuel supply system 13, such that some of the heat transferred to components within a heated exterior environment 184 may be transferred to components disposed in cooler environments. The outer coating 162 of heated components within the heated exterior environment 184 thermally insulates the interiors of the heated components such that the heat transferred to other components in cooler environments may be sufficient to maintain the temperature of the fuel in the interiors of the heated components to be less than a thermal degradation temperature. Thus, the outer coating 162 and connections of the fuel conduit 160 to other components of the fuel supply system 13 facilitate maintenance of the interior 182 of the fuel conduit 160 at a temperature that is lower than a temperature of the exterior environment 184.

In some embodiments, the outer coating thickness 168 is greater than the inner coating thickness 172. The outer coating 162 may be applied in in multiple layers 186 and 188, such as in multiple thin layers (e.g., coating layers) or in one or more thick layers to provide a threshold amount of thermal insulation between the exterior environment 184 and the interior 182 of the fuel conduit 160. For example, the outer coating may be applied in one or more layers each having a thickness of 1 mm, 2 mm, 3 mm, 4 mm, 5 mm, 6 mm, 7, mm, 8 mm, 9 mm, 10 mm, or greater. Although the fuel conduit 160 is discussed as being within the compressor discharge casing 25, the fuel conduit 160 may be alternatively positioned partially or wholly outside of the compressor discharge casing 25. In embodiments in which the fuel conduit 160 is outside of the compressor discharge casing 25, the inner coating 164 may still be provided, as discussed below. However, the outer coating 162 may be disposed in a thinner layer or may be omitted altogether if the fuel conduit 160 is outside of the compressor discharge casing 25. In this manner, non-catalytic coke formation is reduced or eliminated within the fuel conduit 160 because the fuel 14 passing therethrough is maintained at a temperatures less than the thermal degradation temperature.

Additionally, the fuel conduit 160 may be formed of a base material, such as iron, cobalt, nickel, copper, tin, zinc, chromium, or an alloy including a base material. If placed into contact with the base material, the fuel 14 may undergo catalytic reactions, resulting in catalytic coke formation on the inner surface 170 of the fuel conduit 160. As such, the inner coating 164 physically separates the fuel 14 from the inner surface 170, physically separating the fuel 14 from reaching the base material that would otherwise catalyze the catalytic coke formation. Additionally, the inner coating 164 may be chemically inert with respect to the fuel 14, such that the fuel 14 does not chemically react with the inner coating 164. As such, the inner coating 164 may also be resistant to acidic and/or basic environments. The inner coating 164 may be disposed on all or a portion of the fuel-wetted components of the fuel supply system 13, including components which are not positioned within the compressor discharge casing 25. In this manner, the inner coating 164 may prevent or reduce catalytic coke formation in the fuel supply system 13.

The outer coating 162 and the inner coating 164 may be disposed on the fuel conduit 160 by one or more application processes. For example, an air plasma spray device may be employed to apply coating materials to form the outer coating 162 on the outer surface 166 and to form the inner coating 164 on the inner surface 170. The air plasma spray device may be used to form the outer coating 162 and the inner coating 164 by ionizing an inert gas via an electric current to form a plasma. Then, the air plasma spray device may transfer thermal energy from the plasma to the coating materials to form a heated coating material. Additionally, the air plasma spray device may impinge the heated coating material on the fuel conduit 160 to form an impinged coating material. Then, the impinged coating materials may cool to form the outer coating 162 and the inner coating 164 on the fuel conduit 160. Additionally, any other suitable process, such as painting with a brush, electron beam physical vapor deposition, high velocity oxygen fuel, electrostatic spray-assisted vapor deposition, direct vapor deposition, or any other thermal barrier coating application process may be used according to the techniques disclosed herein to form the outer coating 162 and the inner coating 164.

Moreover, the outer coating 162 and the inner coating 164 may be formed from a common coating material. By using a common coating for both the outer coating 162 and the inner coating 164, the fuel conduit 160 may be protected against coke formation more efficiently due to lower application costs. That is, a common process (e.g., air plasma spray process) may be used to apply the outer coating 162 and the inner coating 164 to the fuel conduit 160. In this manner, tools or devices used to apply the outer coating 162 to the outer surface 166 may be reused to apply the inner coating to the inner surface 170, or the outer coating 162 and the inner coating 164 may both be applied to the fuel conduit 160 at the same time (e.g., within a time threshold, during a shared work session).

Additionally, physical properties of the outer coating 162 and the inner coating 164 enable the coatings to reduce or eliminate coke formation on the fuel conduit 160. In some embodiments, the outer coating 162 and the inner coating 164 are thermal barrier coatings. Any suitable thermal barrier coating for thermally insulating the fuel 14 from the exterior environment 184 and for physically preventing the fuel 14 from contacting base material may be used to inhibit coke formation, including an RLHY-12 coating (e.g., RLHY-12/800 coating). The RLHY-12 coating, having a low thermal conductivity value of 0.03 W/(m*K), effectively insulates the fuel conduit 160 from the exterior environment 184. Additionally, other suitable thermal barrier coatings having a thermal conductivity values less than 0.10 W/(m*K), 0.05 W/(m*K), 0.03 W/(m*K), 0.01 W/(m*K) or less may also be used. For example, other suitable thermal barrier coatings may include yttria-stabilized zirconia (YSZ), mullite, alumina, ceria and YSZ, rare-earth zirconates, rare-earth oxides, metal-glass composites, as well as other thermally resistant materials.

Further, the outer coating 162 and the inner coating 164 may have considerable usable lifetimes on the fuel conduit 160, such as 1 year, 2 years, 3 years, 4, years, 5 years, 6 years, 7 years, 8 years, 9 years, 10 years, or longer. As such, the outer coating 162 and the inner coating 164 may be highly stable materials that do not react with either the fuel 14 or the base material of the fuel conduit 160. Additionally, to enable the outer coating 162 and the inner coating 164 to remain on the fuel conduit 160, the outer coating 162 and the inner coating 164 may have high adhesive properties. Further, the outer coating 162 and the inner coating 164 may have a high tensile strength and elasticity to enable the outer coating 162 and the inner coating 164 to expand and contract in response to thermal expansion or contraction of the fuel conduit 160. Moreover, the outer coating 162 and the inner coating 164 may include a high wear resistance and impact resistance to protect the fuel conduit 160 from physical forces in the exterior environment 184 (e.g., impacts, punctures, scrapes, etc.).

Figure 5:
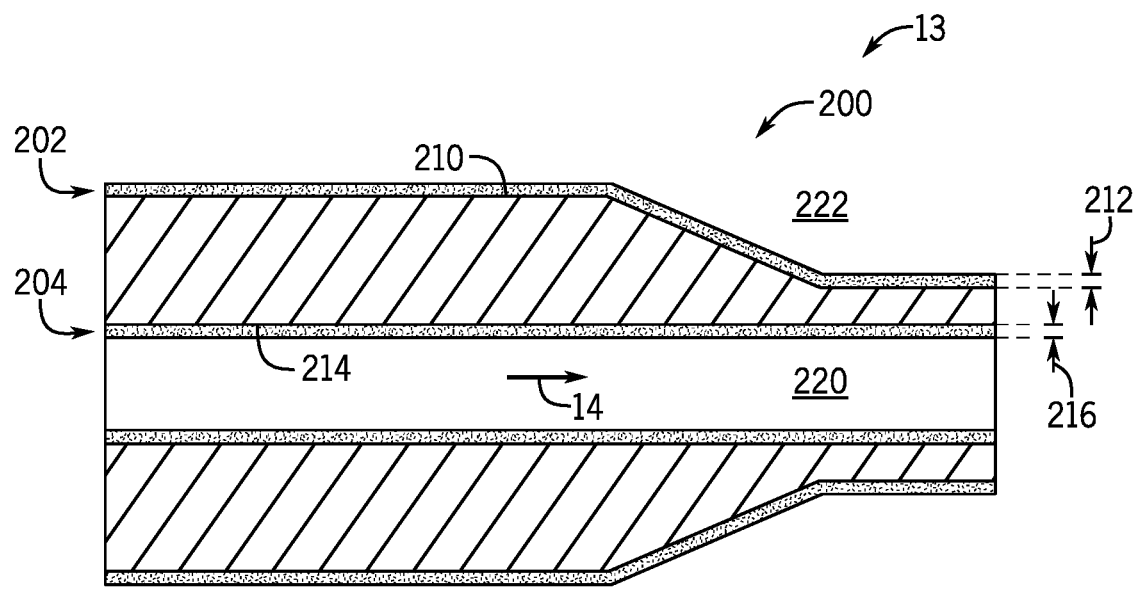
FIG. 5 is a cross-section of an embodiment of a fuel nozzle having an outer coating and an inner coating.

FIG. 5 is a cross-section of an embodiment of a fuel nozzle 200 having an outer coating 202 and an inner coating 204. In some embodiments, the fuel nozzle 200 is the fuel nozzle 12 discussed above. The fuel nozzle 200 intakes fuel 14 for distribution into the combustor. The fuel nozzle 200 may distribute the fuel 14 into the combustor in a desired ratio with air, in a desired shape, at a desired rate, or with any other parameters for enabling combustion within the combustor. As shown, the outer coating 202 is disposed on an outer surface 210 of the fuel nozzle 200 and has an outer coating thickness 212. Additionally, the inner coating 204 is disposed on an inner surface 214 of the fuel nozzle 200 and has an inner coating thickness 216. The outer coating thickness 212 and the inner coating thickness 216 may be different from one another. Moreover, as discussed above, the outer coating 202 and the inner coating 204 may be disposed on the fuel nozzle 200 by any suitable application process, and may be formed from a common coating material. Additionally, physical properties of the outer coating 202 and the inner coating 204 enable the coatings to reduce or prevent coke formation on the fuel nozzle 200. In some embodiments, the outer coating 202 and the inner coating 204 are thermal barrier coatings, such as RLHY-12 coatings.

The outer coating 202 and the inner coating 204 may operate to simultaneously reduce fuel 14 from coking via both non-catalytic coke formation and catalytic coke formation within the fuel nozzle 200. Indeed, as discussed above with reference to FIG. 2, the fuel nozzle 200 may be located within the compressor discharge casing 25 of the fuel supply system 13. The outer coating 202 insulates the fuel 14 in an interior 220 of the fuel nozzle 200 from an exterior environment 222 within the compressor discharge casing 25, thus maintaining the fuel 14 at a temperature less than the thermal degradation temperature. In this manner, the outer coating 202 reduces or eliminates non-catalytic coke formation within the fuel nozzle 200. Additionally, the fuel nozzle 200 may be formed of a base material. The inner coating 204 disposed on the inner surface 214 of the fuel nozzle 200 physically separates the fuel 14 from the base material within the fuel nozzle 200. In this manner, the inner coating 204 may prevent or reduce catalytic coke formation in the fuel supply system 13 by physically separating the fuel 14 from reaching the base material that would otherwise catalyze the catalytic coke formation.

Figure 6:
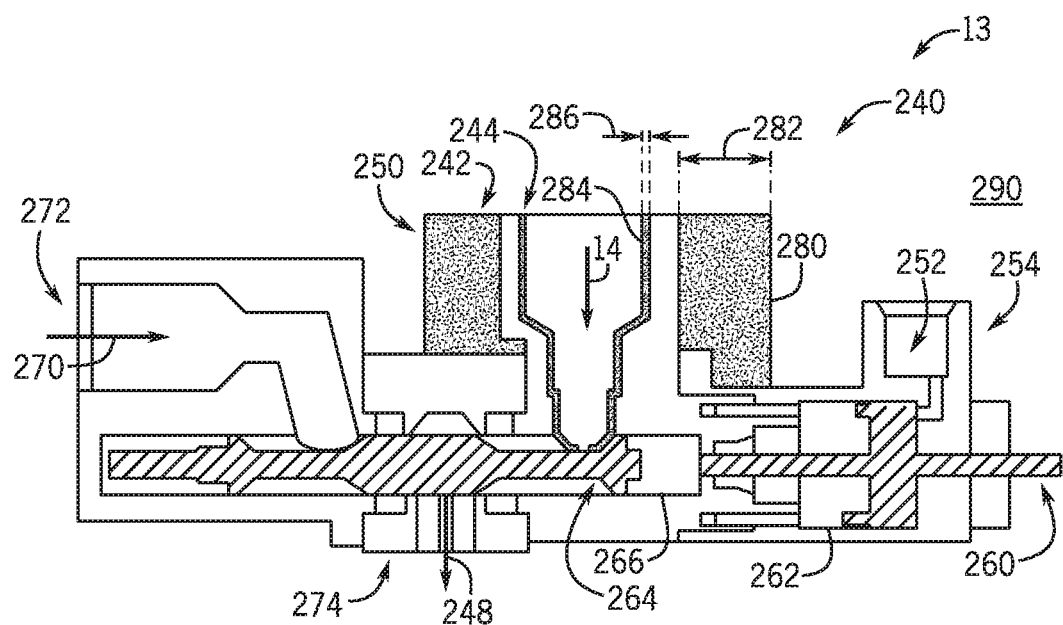
FIG. 6 is a cross-section of an embodiment of a three-way valve having an outer coating and an inner coating.

FIG. 6 is a cross-section of an embodiment of a three-way valve 240 having an outer coating 242 and an inner coating 244. In some embodiments, the three-way valve 240 is the three-way valve 72 discussed above with reference to FIG. 2. The three-way valve 240 intakes fuel 14 (e.g., liquid fuel) into a first inlet 250. Additionally, actuating air 252 enters a second inlet 254 of the three-way valve 240. The actuating air 252 may be selectively released by a control valve upon instruction by a controller, thus moving a first piston 260 within a first piston chamber 262. When moved to the left, the first piston 260 may contact a spool 264 within a spool chamber 266, applying force to move the spool 264 to the left. When moved to the left, the spool 264 fluidly connects a flow path between the first inlet 250 and an outlet 274 of the three-way valve 240. During normal operation of the gas turbine system 10, the fuel 14 flows from the first inlet 250, passively actuates the spool 264, and flows out of the outlet 274 to provide fuel to the fuel nozzle and to the combustors.

When moved to the right, the spool 264 fluidly connects a flow path between a third inlet 272 and the outlet 274. In embodiments having a recirculation and purging system, purge air 270 may be selectively released to enter the third inlet 272 and flow through the spool 264 and through an outlet 274 of the three-way valve 240. However, the third inlet 272 may be stoppered, blocked, or the purge air 270 may not be provided in embodiments without the recirculation and purging system. In this manner, the actuating air 252 controls movements of fluid through the three-way valve 240 to selectively enable either the fuel 14 or the purge air 270 to flow through the three-way valve 240.

As shown, the outer coating 242 is disposed on an outer surface 280 of the three-way valve 240 and has an outer coating thickness 282. Additionally, the inner coating 244 is disposed on an inner surface 284 of three-way valve 240 and has an inner coating thickness 286. Moreover, fuel-wetted surfaces of the spool 264, the spool chamber 266, and the outlet 274 may also include the inner coating 244 to reduce or eliminate catalytic coke formation thereon. Additionally, as discussed above, the outer coating 242 and the inner coating 244 may be disposed on the three-way valve 240 by any suitable application process, and may be formed from a common coating material. Additionally, physical properties of the outer coating 242 and the inner coating 244 enable the coatings to reduce or prevent coke formation on or in the three-way valve 240. In some embodiments, the outer coating 242 and the inner coating 244 are thermal barrier coatings, such as RLHY-12 coatings.

The outer coating 242 and the inner coating 244 may operate to simultaneously reduce or prevent fuel 14 from coking via both non-catalytic coke formation and catalytic coke formation within the three-way valve 240. Indeed, as discussed above with reference to FIG. 2, the three-way valve 240 may be located within the compressor discharge casing 25 of the fuel supply system 13. The outer coating 242 insulates the fuel 14 within the three-way valve 240 from an exterior environment 290 within the compressor discharge casing 25, thus maintaining the fuel 14 at a temperature less than the thermal degradation temperature. In this manner, the outer coating 242 reduces or eliminates non-catalytic coke formation within the three-way valve 240. Additionally, the three-way valve 240 may be formed of a base material. The inner coating 244 disposed on the inner surface 284 of the three-way valve 240 physically separates the fuel 14 from the base material within the three-way valve 240. In this manner, the inner coating 244 may prevent or reduce catalytic coke formation in the fuel supply system 13 by physically separating the fuel 14 from reaching the base material that would otherwise catalyze the catalytic coke formation.

Figure 7:
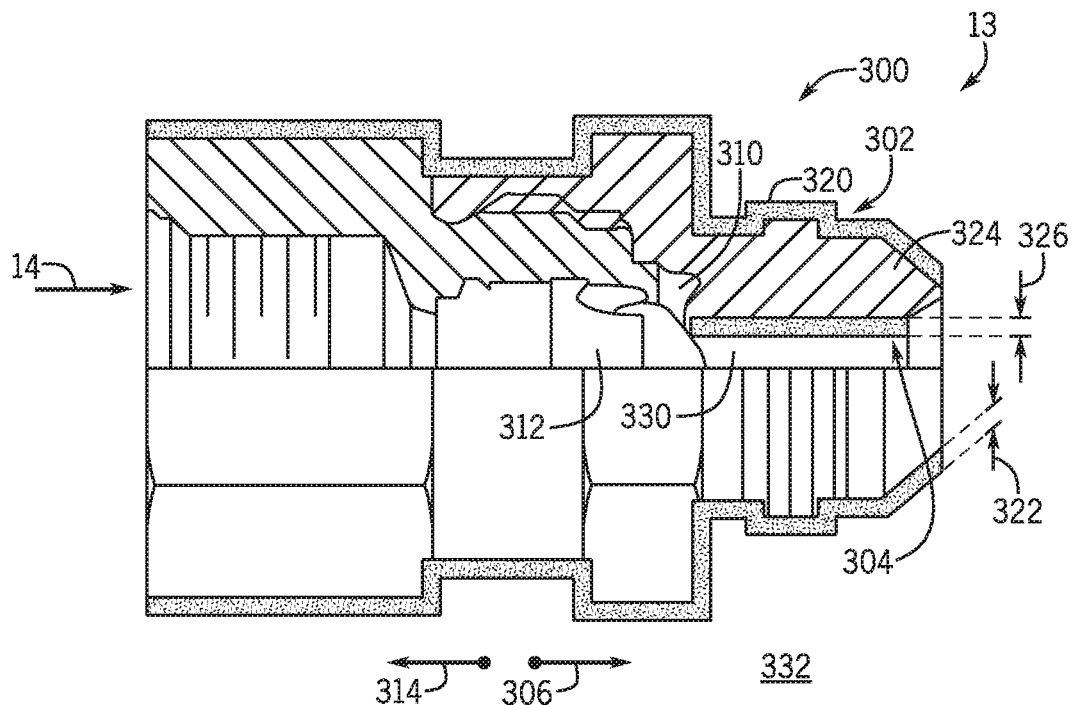
FIG. 7 is a cut-away view of an embodiment of a check valve having an outer coating and an inner coating.

FIG. 7 is a cut-away view of an embodiment of a check valve 300 having an outer coating 302 and an inner coating 304. In some embodiments, the check valve 300 is the valve 122 discussed above with reference to FIG. 3. The check valve 300 intakes fuel 14 that has been pressurized via a fuel forwarding pump or another suitable fluid motivating source, and directs the fuel 14 to a fuel nozzle. To ensure the fuel 14 flows along a forward direction 306, the check valve 300 includes a ball element 310 disposed within a ball cage 312. If reverse flow of the fuel 14 (e.g., along a reverse direction 314) reached the check valve 300, the ball element 310 would seal against the ball cage 312, physically blocking the fuel 14 from flowing past the ball element 310. Although shown as a ball check valve, any other suitable type of check valve for enabling forward flow of the fuel 14 along the forward direction 306 and physically blocking reverse flow of the fuel 14 along the reverse direction 314 may be used. As shown, the outer coating 302 is disposed on an outer surface 320 of the check valve 300 and has an outer coating thickness 322. Additionally, the inner coating 304 is disposed on an inner surface 324 of the check valve 300 and has an inner coating thickness 326. Moreover, as discussed above, the outer coating 302 and the inner coating 304 may be disposed on the check valve 300 by any suitable application process, and may be formed from a common coating material. Additionally, physical properties of the outer coating 302 and the inner coating 304 enable the coatings to reduce or eliminate coke formation on and in the check valve 300. In some embodiments, the outer coating 302 and the inner coating 304 are thermal barrier coatings, such as RLHY-12 coatings.

The outer coating 302 and the inner coating 304 may operate to simultaneously reduce or prevent fuel 14 from coking via both non-catalytic coke formation and catalytic coke formation within the check valve 300. Indeed, as discussed above with reference to FIG. 3, the check valve 300 may be located within the compressor discharge casing 25 of the fuel supply system 13. The outer coating 302 insulates the fuel 14 in an interior 330 of the check valve 300 from an exterior environment 332 within the compressor discharge casing 25, thus maintaining the fuel 14 at a temperature less than the thermal degradation temperature. In this manner, the outer coating 302 reduces or eliminates non-catalytic coke formation within the check valve 300. Additionally, the check valve 300 may be formed of a base material. The inner coating 304 disposed on the inner surface 324 of the check valve 300 physically separates the fuel 14 from the base material within the check valve 300. In this manner, the inner coating 304 may prevent or reduce catalytic coke formation in the fuel supply system 13 by physically separating the fuel 14 from reaching the base material that would otherwise catalyze the catalytic coke formation.

Figure 8:
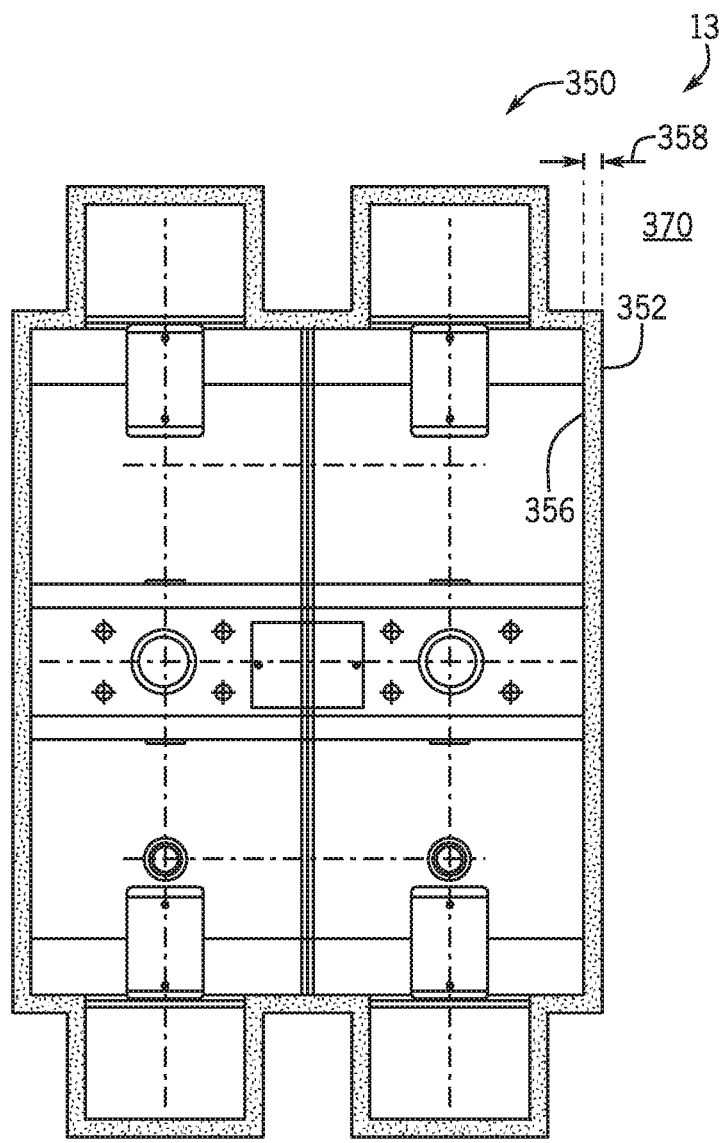
FIG. 8 is a schematic diagram of an embodiment of a mixing valve having an outer coating and an inner coating.

FIG. 8 is a schematic diagram of an embodiment of a mixing valve having an outer coating 352 and an inner coating. In some embodiments, the mixing valve 350 is the valve 122 discussed above with reference to FIG. 3 and provides fuel 14 to the combustor. As shown, the outer coating 352 is disposed on an outer surface 356 of the mixing valve 350 and has an outer coating thickness 358. Additionally, the inner coating is disposed on an inner surface of the mixing valve 350 and has an inner coating thickness. Moreover, as discussed above, the outer coating 352 and the inner coating may be disposed on the mixing valve 350 by any suitable application process, and may be formed from a common coating material. Additionally, physical properties of the outer coating 352 and the inner coating enable the coatings to reduce or eliminate coke formation on or in the mixing valve 350. In some embodiments, the outer coating 352 and the inner coating are thermal barrier coatings, such as RLHY-12 coatings.

The outer coating 352 and the inner coating may operate to simultaneously reduce or eliminate coking via both non-catalytic coke formation and catalytic coke formation within the mixing valve 350. Indeed, as discussed above with reference to FIG. 3, the mixing valve 350 may be located within the compressor discharge casing 25 of the fuel supply system 13 of FIG. 3. The outer coating 352 insulates the fuel 14 in an interior of the mixing valve 350 from an exterior environment 370 within the compressor discharge casing 25, thus maintaining the fuel at a temperature less than the thermal degradation temperature. In this manner, the outer coating 352 reduces or eliminates non-catalytic coke formation within the mixing valve 350. Additionally, the mixing valve 350 may be formed of a base material. The inner coating disposed on the inner surface of the mixing valve 350 physically separates the fuel from the base material within the mixing valve 350. In this manner, the inner coating may prevent or reduce catalytic coke formation in the fuel supply system 13 by physically separating the fuel from reaching the base material that would otherwise catalyze the catalytic coke formation.

Figure 9:
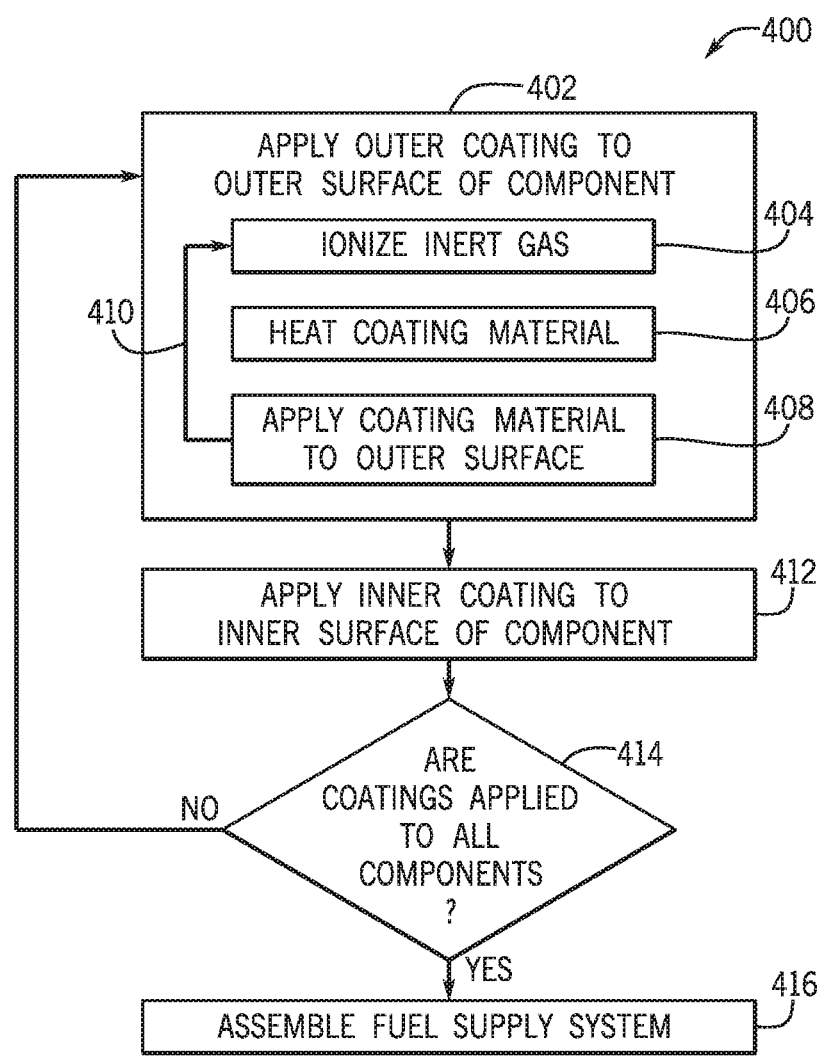
FIG. 9 is a flow chart of an embodiment of a method for forming a component having an inner coating and an outer coating.

FIG. 9 is a flow chart of an embodiment of a method 400 for forming an outer coating and an inner coating on a component of the fuel supply system 13. One or more steps of the method 400 may be performed simultaneously or in a different sequence from the sequence in FIG. 9. Additionally, the method 400 of FIG. 9 is described with reference to the elements of FIGS. 1-8. First, the method 400 may include applying (block 402) an outer coating 162 to an outer surface 166 of a component of the fuel supply system 13, such as the fuel conduit 160. As discussed above, the outer coating 162 insulates an interior an interior 182 of the fuel conduit 160 from an exterior environment 184 to reduce or eliminate non-catalytic coke formation within the interior 182 of the fuel conduit 160. The outer coating 162 may be a coating material, such as a thermal barrier coating material that is applied in one or more layers by any suitable process.

For example, if using the air plasma spray process discussed above, the method 400 may optionally include ionizing (block 404) an inert gas with an air plasma spray device. For example, the air plasma spray device may generate an electric current that ionizes an inert gas, such as nitrogen, into a plasma. Additionally, the method 400 may optionally include heating (block 406) a coating material with the plasma to form a heated coating material. The method 400 may also optionally include applying (block 408) the heated coating material to the outer surface of the component. Then, the heated coating material may cool to form a layer of the outer coating. Additionally, the method 400 may optionally include continuing (block 410) to perform blocks 404, 406, and 408 until a desired number of layers or thickness of the outer coating is achieved. However, any other suitable coating process, such as painting with a brush, electron beam physical vapor deposition, high velocity oxygen fuel, electrostatic spray-assisted vapor deposition, direct vapor deposition, or any other thermal barrier coating application process may be used to apply (block 402) the outer coating to the outer surface.

Additionally, the method 400 may include applying (block 412) an inner coating 164 to an inner surface 170 of the component of the fuel supply system 13, such as the fuel conduit 160. The inner coating 164 may also be a thermal barrier coating that is applied in one or more layers. Application of the inner coating 164 may be similar to the application of the outer coating 162. Indeed, in some embodiments, the inner coating 164 is a common coating with the outer coating 162, such that the fuel conduit 160 is protected against coke formation more efficiently due to lower application costs via a common application process, such as air plasma spraying. As discussed above, the inner coating 164 physically separates the fuel 14 from contacting base material of the inner surface 170 of the fuel conduit 160 that would otherwise catalyze the catalytic coke formation.

The method 400 may also include determining (node 414) if coatings are applied to all components (e.g., a predetermined selection of components) of the fuel supply system 13. If the method 400 determines via node 414 that all components of the fuel supply system 13 do not include the desired respective outer coatings and inner coating, the method 400 may cycle back to block 402 to continue respectively applying (block 402) outer coatings and applying (block 412) inner coatings. For example, the outer coating may be applied to any suitable components of the fuel supply system 13, such as the fuel nozzle 12, the three-way valve 240, the check valve 300, the mixing valve 350, or any combination thereof to similarly reduce or eliminate non-catalytic coke formation respectively within the interior of the suitable components of the fuel supply system 13. Additionally, the inner coating may be applied to any suitable components of the fuel supply system 13, such as the fuel nozzle 12, the three-way valve 240, the check valve 300, the mixing valve 350, or any combination thereof to similarly reduce or eliminate catalytic coke formation respectively with base material within the inner surface of the suitable components of the fuel supply system 13.

If the method 400 determines via node 414 that all coatings are applied to the components of the fuel supply system 13, the method 400 may include assembling (block 416) the fuel supply system 13 from the coating components. However, in some embodiments, the components of the fuel supply system 13 may be coated with the outer coating and the inner coating after the fuel supply system 13 is partially or wholly assembled. As such, employing the method 400 enables components of the fuel supply system 13 to be protected against non-catalytic and catalytic coke formation simultaneously, without the added complexity or operating costs of recirculation and purging systems.

Technical effects of the subject matter include systems and methods for providing outer coatings and inner coatings on components of a fuel supply system to reduce or eliminate non-catalytic coke formation and catalytic coke formation of fuel within the fuel supply system. The components may include any fuel-wetted components, any components disposed within an environment having a temperature greater than the thermal degradation temperature of the fuel, or a combination thereof. The outer coating is disposed on the outer surface of a component to insulate the interior of the component to maintain an interior temperature therein that is less than the thermal degradation temperature of the fuel. Thus, the outer coating may reduce or eliminate thermal fuel degradation that would otherwise cause non-catalytic coke formation. Additionally, the inner coating is disposed on the inner surface of the component to physically separate the fuel from contacting base material within the component that would otherwise catalyze chemical reactions that produce catalytic coke formation on or within the component. Thus, by employing the outer coating and the inner coating on the component, both catalytic and non-catalytic coke formation of fuel within the component may be reduced or eliminated, as compared to components without the coatings. As such, recirculation and/or purging systems traditionally actively employed to reduce coke formation may be used less often, used for shorter periods of time, or removed altogether. In this manner, the disclosed techniques provide energy savings and enable reductions in complexity for gas turbine systems having fuel supply system components protected by the outer coating and the inner coating.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A fuel supply system comprising:
a first component configured to direct a fuel flow to a combustor of an engine system, wherein the first component is made of a metal, and the first component comprises a first inner surface and a first outer surface;
a first outer coating disposed on the first outer surface of the first component, wherein the first outer coating comprises a first thickness and is configured to thermally insulate a first interior of the first component to reduce non-catalytic coke formation in the first interior; and
a first inner coating disposed on the first inner surface of the first component, wherein the first inner coating comprises a second thickness and is configured to reduce contact of the fuel flow with the metal of the first inner surface of the first component to reduce catalytic coke formation in the first interior, wherein the first thickness is greater than the second thickness, wherein the first thickness and the second thickness each comprise a common coating material extending entirely therethrough along a radial direction, wherein a component thickness of the first component is greater than the first thickness and greater than the second thickness, and wherein the first outer coating comprises one or more layers each having a thickness of 1 mm to 10 mm to define the first thickness of the first outer coating.

2. The fuel supply system of claim 1, wherein the first component comprises a fuel conduit or a liquid fuel nozzle.

3. The fuel supply system of claim 2, wherein the fuel supply system comprises a second component configured to direct the fuel flow to the combustor, wherein the second component comprises a second inner surface and a second outer surface, a second outer coating is disposed on the second outer surface, and a second inner coating is disposed on the second inner surface.

4. The fuel supply system of claim 3, wherein the second component comprises a three-way valve, a liquid fuel check valve, or a mixing valve.

5. The fuel supply system of claim 1, excluding a recirculation system or a purging system, or any combination thereof.

6. The fuel supply system of claim 1, wherein the one or more layers of the first outer coating comprises a plurality of layers of the common coating material collectively defining the first thickness.

7. The fuel supply system of claim 1, wherein the common coating material comprises a RLHY-12 thermal barrier coating material.

8. The fuel supply system of claim 1, wherein the common coating material comprises a thermal barrier coating having a thermal conductivity value equal to or less than 0.03 watts per meter-kelvin ($W \cdot m^{-1} \cdot K^{-1}$).

9. The fuel supply system of claim 1, excluding a recirculation system and a purging system, wherein the engine system comprises a gas turbine system.

10. A fuel supply system comprising:
a plurality of components configured to direct a fuel flow to a combustor of an engine system, wherein each component of the plurality of components is made of a metal and comprises a respective inner surface, a respective outer surface, and a respective interior;
a plurality of respective outer coatings, wherein each respective outer coating is disposed on the respective outer surface of a respective component of the plurality of components, and wherein each respective outer coating is configured to thermally insulate the respective interior of the respective component to reduce non-catalytic coke formation within the respective interior; and
a plurality of respective inner coatings, wherein each respective inner coating is disposed on the respective inner surface of the respective component of the plurality of components, wherein each respective inner coating is configured to reduce contact of the fuel flow with a respective metal of the respective inner surface of each component of the plurality of components to reduce catalytic coke formation in the respective interior;
wherein, on at least one component of the plurality of components, the respective outer coating of the plurality of respective outer coatings comprises a first thickness that is greater than a second thickness of the respective inner coating of the plurality of respective inner coatings, wherein the first thickness and the second thickness each comprise a common coating material extending entirely therethrough along a radial direction, wherein the at least one component is configured to be disposed within a flow path of compressed air from a compressor of the engine system, and wherein the respective outer coating of the plurality of respective outer coatings comprises one or more layers each having a thickness of 1 mm to 10 mm to define the first thickness of the respective outer coating.

11. The fuel supply system of claim 10, wherein the plurality of components comprises a first component and a second component, wherein the first component comprises a first fuel conduit, a first fuel nozzle, a first check valve, a first three-way valve, or a first mixing valve, and the second component comprises a second fuel conduit, a second fuel nozzle, a second check valve, a second three-way valve, or a second mixing valve.

12. The fuel supply system of claim 10, excluding a recirculation system or a purging system, or any combination thereof.

13. The fuel supply system of claim 10, wherein the one or more layers of the respective outer coating of the plurality of respective outer coatings comprises a plurality of layers of the common coating material that define the first thickness.

14. The fuel supply system of claim 10, wherein the at least one component is configured to be disposed within a compressor discharge casing, and wherein the flow path of compressed air extends through the compressor discharge casing.

15. A method comprising:
applying an inner coating to an inner surface of a component configured to transport fuel to a combustor of an engine system, wherein the component is made of a metal, wherein the component is configured to be disposed within a flow path of compressed air from a compressor of the engine system, and wherein the inner coating comprises a first thickness and is configured to reduce catalytic coke formation in an interior of the component by forming a physical barrier between the inner surface and the fuel; and
applying an outer coating to an outer surface of the component, wherein the outer coating comprises a second thickness and is configured to thermally insulate the interior of the component from a heated environment associated with the compressed air to reduce non-catalytic coke formation in the interior, wherein the first thickness is less than the second thickness, wherein the first thickness and the second thickness each comprise a common coating material extending entirely therethrough along a radial direction, and wherein the outer coating comprises one or more layers each having a thickness of 1 mm to 10 mm to define the second thickness of the outer coating.

16. The method of claim 15, wherein the one or more layers comprise a plurality of layers of the common coating material, wherein the plurality of layers collectively define the second thickness.

17. The method of claim 15, wherein the outer coating and the inner coating are applied by a common device.

18. The method of claim 15, comprising assembling a fuel supply system from the component having the inner coating and the outer coating, wherein the outer coating is configured to maintain the interior of the component below a thermal degradation temperature of the fuel.

19. The method of claim 18, wherein the fuel supply system comprises a plurality of additional components, and each additional component of the plurality of additional components comprises the inner coating on a respective inner surface of the respective additional component and the outer coating on a respective outer surface of the respective additional component.

20. The method of claim 15, wherein the one or more layers comprise a plurality of layers, wherein applying the outer coating to the outer surface comprises applying the plurality of layers that form the outer coating with an air plasma spray device, and wherein applying the plurality of layers comprises:
ionizing an inert gas via an electric current to form a plasma;
transferring thermal energy from the plasma to a coating material to form a heated coating material;

impinging a first amount of the heated coating material on the outer surface to form a first layer of the plurality of layers; and impinging a second amount of the heated coated material on the first layer of the plurality of layers to form the outer coating.

\* \* \* \* \*